(12) United States Patent
Sadakata et al.

(10) Patent No.: US 6,277,173 B1
(45) Date of Patent: Aug. 21, 2001

(54) SYSTEM AND METHOD FOR DISCHARGING GAS

(75) Inventors: Takayuki Sadakata; Hiroshi Yoshinaga; Katsuhiro Ozaki, all of Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/192,603

(22) Filed: Nov. 17, 1998

(30) Foreign Application Priority Data

Jun. 18, 1998 (JP) .................................................. 10-171766

(51) Int. Cl.⁷ .............................. B01D 53/04; B01D 53/22
(52) U.S. Cl. ..................................... 95/12; 95/95; 95/131; 95/233; 96/111; 96/136; 96/144
(58) Field of Search ............................... 95/8, 12, 95–102, 95/131, 233; 96/111, 127, 134–136, 144

(56) References Cited

U.S. PATENT DOCUMENTS

| | | | |
|---|---|---|---|
| 3,675,392 | * | 7/1972 | Reighter .............................. 95/131 X |
| 4,557,921 | * | 12/1985 | Kirsch et al. ....................... 95/131 X |
| 5,125,934 | * | 6/1992 | Krishnamurthy et al. ............. 95/101 |
| 5,259,868 | * | 11/1993 | Doubrawa et al. ....................... 95/12 |
| 5,437,710 | * | 8/1995 | Grant et al. .............................. 95/12 |
| 5,453,113 | * | 9/1995 | Zarchy et al. ..................... 95/102 X |
| 5,976,222 | * | 11/1999 | Yang et al. ......................... 95/131 X |
| 6,017,382 | * | 1/2000 | Ji et al. .............................. 95/131 X |

* cited by examiner

Primary Examiner—Robert H. Spitzer
(74) Attorney, Agent, or Firm—Armstrong, Westerman, Hattori, McLeland & Naughton, LLP

(57) ABSTRACT

A system for discharging gas emitted from an apparatus or facility having a vacuum pump which sucks the gas emitted from the apparatus or facility while being supplied with a gas other than the sucked gas, the system comprising a unit for recovering at least part of the gas discharged from the vacuum pump, and recirculating the recovered gas to the vacuum pump as the gas other than the sucked gas. Part of the recovered gas may be recirculated to the apparatus or facility emitting the gas. The system reduces or eliminates emission to the atmosphere of global warming gases such as perfluorocompounds discharged from the vacuum pump, and also reduces the energy required for operating the vacuum pump. A method for discharging gas emitted from an apparatus or facility using a vacuum pump, wherein emission of global warming gases to the atmosphere is reduced or eliminated, is also disclosed.

16 Claims, 6 Drawing Sheets

SYSTEM AND METHOD FOR DISCHARGING GAS

BACKGROUND OF THE INVENTION

1. Field of the Invention

The invention relates to reuse of a gas discharged from a vacuum pump. More particularly, the invention relates to reuse of a gas discharged from a vacuum pump which operates using a gas for purposes of shaft sealing, improvement of a degree of vacuum, prevention of formation of reaction by-products, inhibition of corrosion, elongation of the life of device, and the like.

2. Description of the Related Art

As an example, in a dry etching step and a chamber cleaning step for a CVD apparatus for a process for manufacture of semiconductor devices, perfluorocompounds (PFCs), such as methane tetrafluoride ($CF_4$), ethane hexafluoride ($C_2F_6$), and nitrogen trifluoride ($NF_3$), are used to etch polysilicon (poly-Si), silicon oxide ($SiO_2$) and the like.

In such steps, a chamber is evacuated by a vacuum pump to a reduced pressure of, for example, the order of 13.3 to 66.5 pascals, and subsequently, a PFC gas is introduced to the chamber to produce a plasma and dry-etch $SiO_2$ or the like. The details of the mechanism of an etching process are not known, but it is presumed that in a chamber, a radical molecule generated from a PFC excited by a high-frequency field reacts with $SiO_2$ or the like present on the surface of a treated substrate or deposited on walls and the like inside the chamber, to thereby proceed with etching, which produces gas components such as $SiF_4$.

In such an etching step, all of the PFC introduced to a chamber is not decomposed and the undecomposed gas is discharged from the chamber by a vacuum pump. As the vacuum pump, such a pump as a dry pump, a mechanical booster pump, or a turbo molecular pump is used, in general. Nitrogen gas is introduced to the vacuum pump, as an inert gas separate from the gas emitted from the chamber, for purposes of shaft sealing, improvement in the degree of vacuum, prevention of formation of reaction by-products (in the case where the gas from the chamber is reactive, products resulted from reactions can be deposited inside the vacuum pump), inhibition of corrosion, elongation of the life of the device, and the like, and is discharged from the vacuum pump along with the gas emitted from the chamber.

Exhaust discharged from a vacuum pump contains gases such as $SiF_4$ formed by the reaction of radical molecules generated from a PFC with $SiO_2$ or the like, and gases formed by decomposition of the PFC by a high-frequency field. Since these gas components include those having a high corrosiveness and high toxicity, the exhaust from a vacuum pump is, in general, modified to have no toxicity by a detoxificating unit prior to being emitted to the atmosphere. As the detoxificating unit, a device which is filled with an adsorbent such as an activated carbon, activated alumina or molecular sieve, or a chemically reactive agent produced by loading an alkaline agent or the like on activated carbon or alumina, is generally used.

Nevertheless, it has recently been deemed to be important to prevent global warming, and the exhaust of gases such as PFCs, having a high global warming potential (GWP), tends to be restricted. To cope with such situation, techniques in which gases having a high GWP in the exhaust from a vacuum pump are decomposed and detoxificated prior to being emitted to the atmosphere, as referred to above, or the exhaust is compressed and gaseous impurities are separated from the compressed exhaust to recover PFCs, have been developed.

As the techniques for decomposing PFCs in an exhaust, methods such as thermal cracking, catalytic thermal cracking, and combustion cracking have been developed. In these processes, PFCs having more carbon atoms are gradually decomposed to PFCs having fewer carbon atoms. For example, when plasma discharge was established in a chamber under the condition of $C_2F_6$ flow rate of 0.1 liter per minute, and the exhaust from the chamber was discharged by a vacuum pump to which $N_2$ was introduced at a flow rate of 28 liters per minute, it was observed that the exhaust at the outlet of the vacuum pump contained 0.01% $CF_4$, 0.12% $C_2F_6$, 0.01% $CH_2F_2$, and in addition, trace amounts of $SiF_4$, HF, $F_2$ and so forth. When the exhaust was further treated in a PFC decomposition unit of thermal cracking type, it was observed that the discharged $N_2$ contained 0.06% $CF_4$ 0.09% CO, and 0.04% $CO_2$, which reveals that the decomposition in the PFC decomposition unit resulted in formation of $CF_4$.

However, since $CF_4$ has a very large GWP 100 of 6,500, it is required to further decompose $CF_4$ into carbon dioxide and fluorine, and change the resultant fluorine to a fixed form prior to removal.

To decompose $CF_4$ in an exhaust, an unreasonable amount of energy is required, which may be unfavorable in the prevention of global warming, in terms of the carbon dioxide generated during the creation of the energy.

Further, in prior gas discharging or evacuating systems, a large amount of nitrogen is introduced to a vacuum pump, and is incorporated in gas emitted from a chamber, as referred to above. In this case, a decomposing unit consumes energy also for the diluted emitted gas, resulting in an increase in energy loss.

Methods of recovering and reusing exhaust containing PFCs have been developed to prevent global warming. In these methods, since there is dilution of the exhaust by nitrogen introduced into a vacuum pump, complicated processes and much energy are required to separate the PFCs and nitrogen in the exhaust.

SUMMARY OF THE INVENTION

Thus, it is an object of the invention to provide a system for discharging gas emitted from a gas emitting source using a vacuum pump to which a gas such as nitrogen is introduced for purposes of shaft sealing, improvement of degree of vacuum, prevention of formation of reaction by-products, inhibition of corrosion, elongated life of the device, and the like, the system not only reducing or eliminating emission to the atmosphere of global warming gases such as PFCs discharged from the vacuum pump but also making energy-saving possible.

It is also an object of the invention to provide a method of reducing or eliminating emission to the atmosphere of global warming gases such as PFCs discharged from such a vacuum pump and also making energy-saving possible.

According to the invention, the system for evacuating gas from an apparatus as a gas emitting source has a vacuum pump which sucks the gas discharged from the apparatus while being supplied with a gas other than the sucked gas, the system comprising a unit for recovering at least part of the gas discharged from the vacuum pump, and recirculating the recovered gas to the vacuum pump as said gas other than the sucked gas.

The system may comprise means for recirculating part of the recovered gas to the gas emitting source from which the gas to be discharged is emitted.

The invention further provides a method for evacuating gas from an apparatus as a gas emitting source using a vacuum pump which sucks the gas discharged from the apparatus while being supplied with a gas other than the sucked gas, the method comprising recovering at least part of the gas discharged from the vacuum pump, and recirculating the recovered gas to the vacuum pump as said gas other than sucked gas.

The recovered gas from the vacuum pump may also be recirculated to the gas emitting source from which the gas to be discharged is emitted.

In the invention, it can be envisaged that gases emitted from an apparatus or facility and sucked by a vacuum pump include gases such as PFCs responsible for global warming, and gases containing PFCs and the like, and the invention will be discussed referring to these gases hereinafter. However, it is, of course, apparent that the invention may be applied to discharge of any other gas which is not necessarily responsible for global warming. Also, although the following discussion is presented referring to an apparatus for manufacturing semiconductor devices as an apparatus emitting gas to be discharged, it is apparent that the apparatus in the invention are not limited thereto.

Thus, as used herein, the gas emitting source means any apparatus or facility emitting a gas to be discharged by a vacuum pump, irrespective of whether or not the discharged gas is responsible for global warming.

BRIEF DESCRIPTION OF THE DRAWINGS

The above and other objects and advantages of the invention will be well understood and appreciated by a person with ordinary skill in the art, from consideration of the following detailed description made by referring to the attached drawings, wherein.

DETAILED DESCRIPTION OF THE INVENTION

Figure 1:
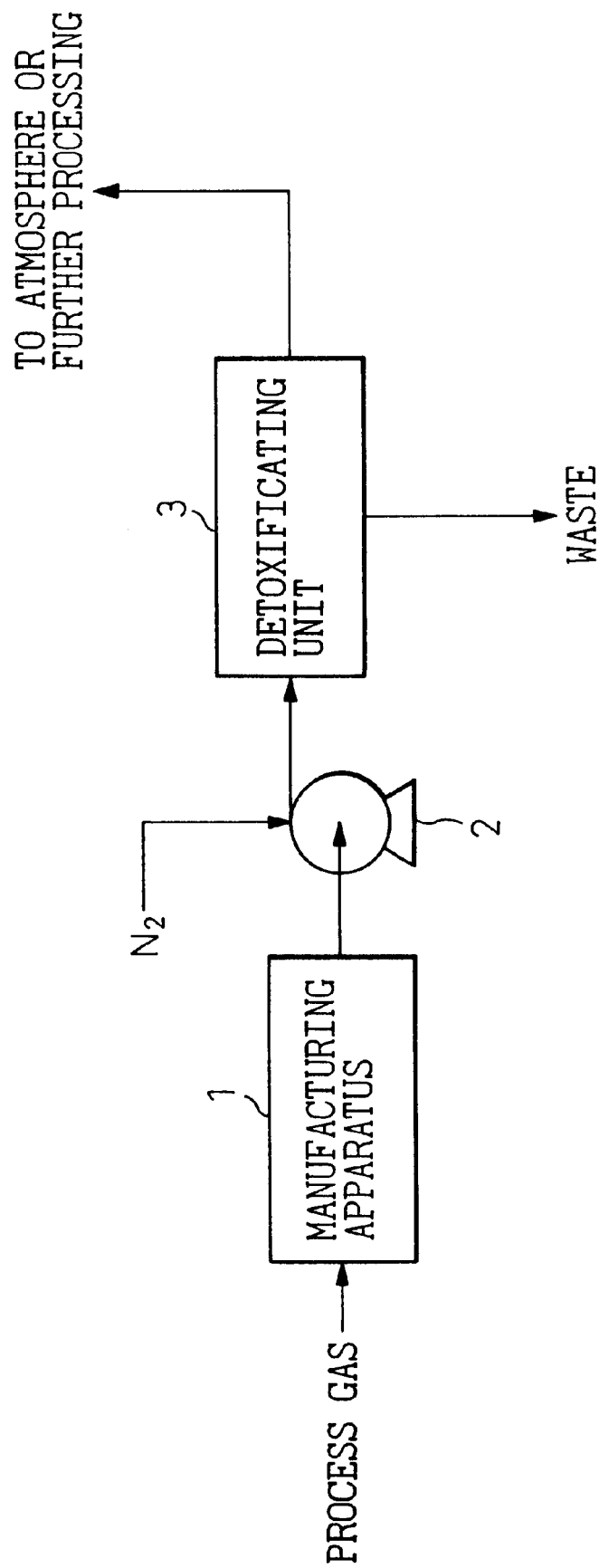
FIG. 1 is an illustration showing a prior system for discharging gas emitted from an apparatus.

FIG. 1 shows a gas discharging system of the prior art. By way of example, $C_2F_6$ is fed, as a process gas for dry etching, to apparatus 1 emitting gas to be discharged, such as an apparatus for manufacturing semiconductor devices. A gas containing unreacted $C_2F_6$ which has not been consumed by dry etching as well as reaction products such as $CF_4$, $CHF_3$, $SiF_4$, HF, and $F_2$, is emitted from the apparatus 1, and is discharged by a vacuum pump 2. In addition to the gas emitted from the apparatus 1, an inert gas such as nitrogen is introduced to the vacuum pump 2 for purposes of shaft sealing, improvement of degree of vacuum, prevention of formation of reaction by-products, inhibition of corrosion, elongated life of the device and the like. The inert gas introduced to the vacuum pump may be sometimes simply called a "sealing gas". The gas from the manufacturing apparatus 1 and the inert gas separately introduced to the vacuum pump 2 are discharged together from the vacuum pump 2, and sent to a detoxificating unit 3. The detoxificating unit 3 removes $SiF_4$, HF, $F_2$ and the like having high corrosiveness and toxicity as wastes. The remaining $C_2F_6$, $CF_4$, and $CHF_3$ are vented to the atmosphere, or transported for a further process.

In this way, all gas emitted from an apparatus and discharged through a vacuum pump was formerly discharged to the outside of a gas discharging system, and was not recovered in the gas discharging system and reused. Consequently, global warming was caused when substances, such as $C_2F_6$, $CF_4$, and $CHF_3$, having a high global warming potential were vented to the atmosphere, or a complicated process and large energy were required when those substances were further treated to avoid venting to the atmosphere.

By contrast, the invention makes it possible to recover and reuse gases responsible for global warming in a gas discharging system without venting the gases to the atmosphere.

Figure 2:
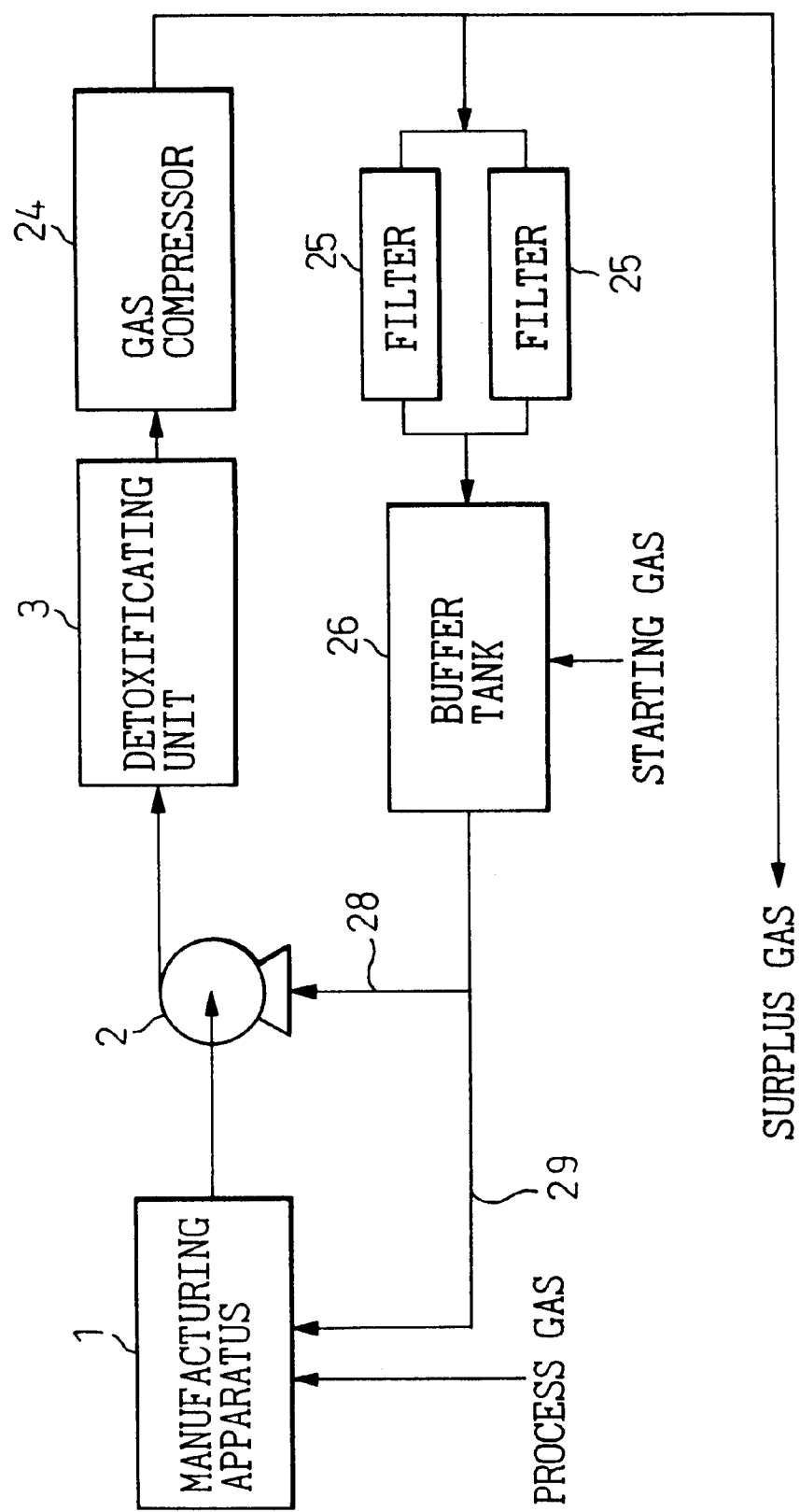
FIG. 2 is a block flow diagram showing the basic concept of the invention.

The basic concept of the invention will now be described, referring to FIG. 2. In the invention, gas emitted from semiconductor device manufacturing apparatus 1 is sucked by a vacuum pump 2. The gas from the vacuum pump 2 is then sent to a detoxificating unit 3 where the gas contains gaseous components, such as $SiF_4$, HF, and $F_2$, which have high corrosiveness and toxicity and are harmful to human body and/or materials used for equipment in the system (hereinafter called "harmful gas components"), and the harmful gas components are removed, and discharged as wastes (not shown). In the detoxificating unit 3, a device which is filled with an adsorbent such as an activated carbon, activated alumina, or molecular sieve, or a chemically reactive agent produced by loading an alkaline agent or the like on activated carbon or alumina, can generally be used.

The gas discharged from the detoxificating unit 3 is then pressurized by a gas compressor 24 to an elevated pressure. The compressed gas is subsequently supplied to the vacuum pump 2 at a given pressure, and accordingly, the gas compressor is required to pressurize the gas to at least a pressure necessary therefor. More specifically, the pressure of gas introduced to the vacuum pump 2 is conventionally of the order of 0.04 to 0.07 MPa, and the gas compressor 24 is required to compress the gas to that pressure plus a pressure loss occurring between the outlet of the gas compressor 24 and the inlet of the vacuum pump 2.

The gas compressed by the gas compressor 24 is then passed through a filter 25 to remove entrained particles. For the filter 25, a filter using a fluororesin membrane, porous ceramic, sintered metal or the like may be used. The filter 25 need not be used if the compressed gas contains no particles. The gas discharging system of the invention may include one or more filters 25, as required.

The gas leaving the filter 25 is stored in a buffer tank or receiver 26, and is reused by the vacuum pump 2 as an inert gas for shaft sealing, and so forth, separate from the gas emitted from the manufacturing apparatus 1. In general, nitrogen to be introduced to a vacuum pump is of the order of 25 to 30 liters per minute, and a corresponding amount of gas is supplied from the buffer tank 26 to the vacuum pump 2. However, an amount of gas to be introduced to the vacuum pump 2 should be determined depending on requirements of the vacuum pump actually used.

In some cases, a gas, such as nitrogen, from the outside of the system may be introduced (not shown) as an inert gas for shaft sealing and so forth, in addition to the gas from the buffer tank 26.

It is also possible that part of the gas from the buffer tank 26 is fed to the manufacturing facilities 1 so as to be used as part of a process gas. To this end, the gas from the buffer tank or receiver 26 is divided into two, one of which is fed to the vacuum pump 2 via line 28, and the other is fed to the facilities 1 via line 29. This is useful when the gas emitted from the manufacturing apparatus comprises unreacted gaseous components.

When surplus gas is produced from the recovered gas (such as a case where the buffer tank 26 is filled with the recovered gas and a pressure of gas in the buffer tank 26 exceeds a predetermined value), the surplus gas may be discharged to the outside of the system. For example, the surplus gas may be transferred to a further apparatus for a further process, or be recovered to transportable or fixed containers. In addition, it is also possible to use part of the recovered surplus gas as a gas for starting the gas discharging system, for example.

As described above, the gas discharging system of the invention comprises, in general, the vacuum pump 2, and the gas compressor 24 for pressurizing the gas discharged from the vacuum pump 2 for recirculation, and further comprises, as required, one or both of the detoxificating unit 3 and the filter 25. The buffer tank 26 is preferred to be provided for stable operation of the system, but may be omitted in some cases. For example, when the gas discharging system operates in such a manner that the gas recovered in the system is introduced directly to the vacuum pump 2 without being passed through the buffer tank 26, all the surplus gas can be discharged to the outside of the system and, if the recovered gas is decreased and the gas introduced to the vacuum pump 2 is short, the shortage of recovered gas can be made up for by an inert gas such as nitrogen from the outside of the system.

At the time of starting the gas discharging system of the invention, a starting gas may be fed to the system from any one or more locations of the system. In FIG. 2, a starting gas is supplied to the buffer tank 26. The starting gas may be fed to the manufacturing apparatus 1. As the starting gas, a process gas used in the manufacturing apparatus 1, such as $CF_4$ or $C_2F_6$, can be used. Alternatively, a gas discharged to the outside of the system as surplus gas may be used as a starting gas. If a capacity of the buffer tank 26 is sufficiently large, part of the gas stored in the tank can be used to start up the system. When the surplus gas or gas stored in the buffer tank 26 is used as a starting gas, the gas discharging system can be more quickly started up because the composition of the gas corresponds to or is close to that at steady-state operation.

According to the invention, it is possible to make unnecessary, or reduce, the conventional introduction of an inert gas such as $N_2$ to a vacuum pump, by recovering gas comprising perfluorocompounds (PFCs), such as $CF_4$, $CHF_3$, $C_2F_6$, $HF_3$, and $SF_6$, contained in gas emitted from a semiconductor device manufacturing apparatus, and using the recovered gas as an inert gas for the vacuum pump.

In addition, by also introducing a process gas containing PFCs which is used in the manufacturing apparatus at the time of starting the vacuum pump, as described above, dilution of the emitted gas by $N_2$ can be prevented.

When a gas emitted from a manufacturing apparatus or facility contains PFCs in an amount of the order of 0.5 to 1.5 liters per minute, a vacuum pump operating with introduction of $N_2$ of the order of 25 to 30 liters per minute is generally used, and accordingly, the PFCs are diluted to less than 10%. If the introduction of $N_2$ to the vacuum pump is eliminated or reduced, the gas emitted from manufacturing apparatus is not, or is less, diluted, resulting in easy recovery of components in the emitted gas which can be reused.

Furthermore, when the recovered gas is used for a process gas for the manufacturing apparatus, it is possible to decrease an amount of process gas to be freshly fed to the manufacturing apparatus.

Figure 3:
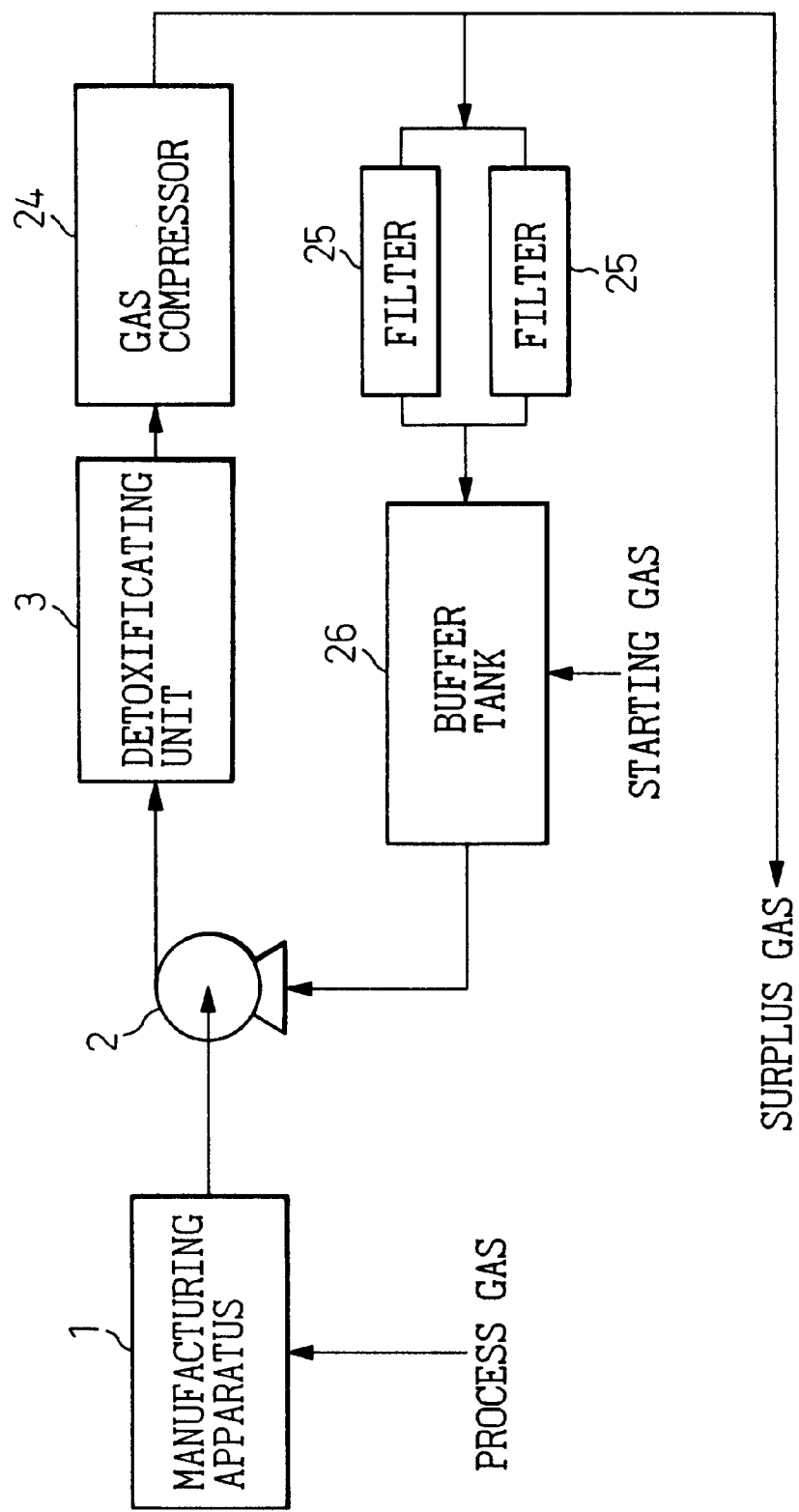
FIG. 3 shows a first embodiment of the invention.

An embodiment of the invention is shown in FIG. 3. This embodiment represents the case where a recovered gas is fed only as an inert gas for a vacuum pump.

Gas from the manufacturing apparatus 1 is sent to a detoxificating unit 3 through a vacuum pump 2, as described above, where harmful gas components are removed. The recovered gas, free of the harmful gas components, is compressed by a gas compressor 24, cleaned of particles by a filter 25, and filled into a buffer tank 26. The gas in the buffer tank 26 is supplied to the vacuum pump 2 as an inert gas.

Figure 4:
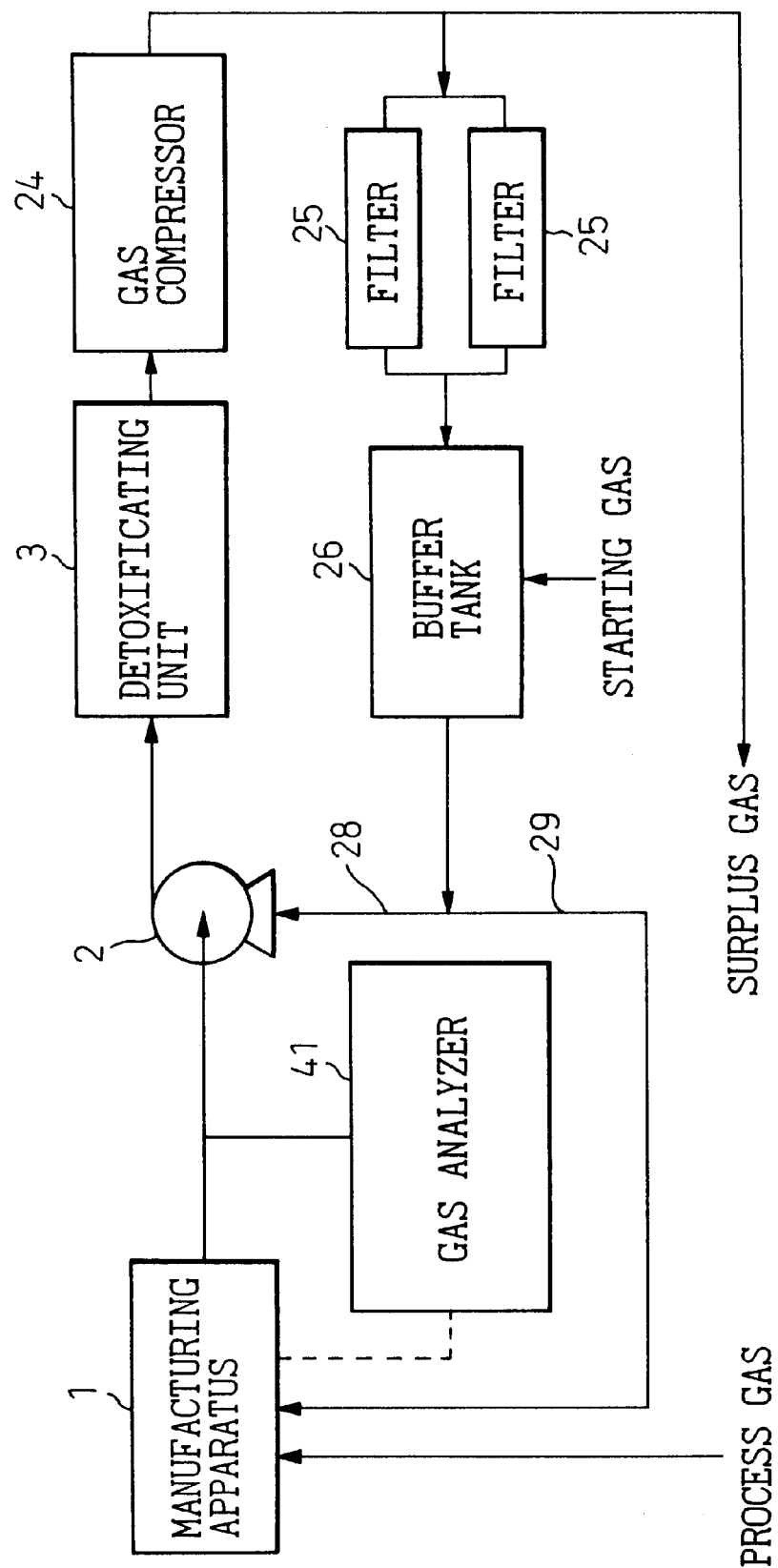
FIG. 4 shows a second embodiment of the invention.

Another embodiment of the invention is shown in FIG. 4. This embodiment is similar to the embodiment shown in FIG. 3, except that the recovered gas supplied from the buffer tank 26 is divided into two, one being fed to the vacuum pump 2 as an inert gas, and the other being fed to the manufacturing apparatus 1 as a process gas to be reused. The manufacturing apparatus 1 use a mixed gas of the recovered gas and a gas fed from a conventional process gas source. To stabilize etching in the manufacturing apparatus 1, for example, process conditions in the manufacturing apparatus 1 can be optimized by measuring the amounts of gas components in the gas emitted from the manufacturing apparatus 1 by a measuring device, such as a gas analyzer 41, and feeding back obtained data to the manufacturing apparatus 1.

Figure 5:
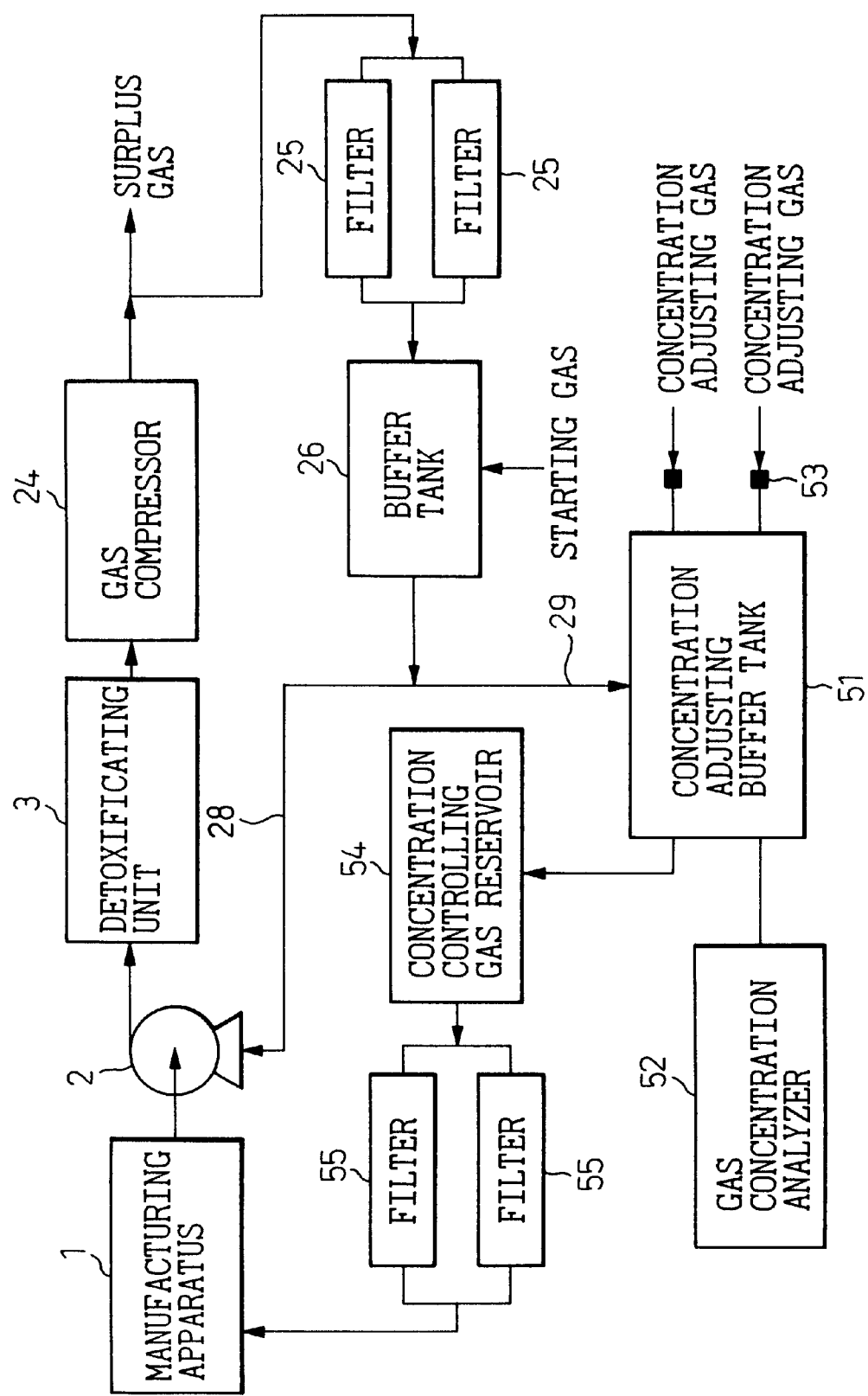
FIG. 5 shows a third embodiment of the invention.

A further embodiment of the invention is shown in FIG. 5. In this embodiment, the recovered gas is fed to the manufacturing apparatus 1 through a concentration adjusting buffer tank 51, as contrasted with the embodiment illustrated in FIG. 4 in which the recovered gas is fed directly to the manufacturing apparatus. In the embodiment of FIG. 5, a process gas concentration in the tank 51 is monitored by a gas concentration analyzer 52, and at least a concentration adjusting gas (process gas) is supplied to the concentration adjusting buffer tank 51 through a mass flow controller 53 which is interlocked with the gas concentration analyzer 52, to thereby adjust the gas concentration in the tank 51 to a concentration required in the manufacturing apparatus 1. The concentration adjusted gas in the tank 51 is fed to the manufacturing apparatus 1 through a concentration controlling gas reservoir 54. The concentration adjusting buffer tank 51 may be provided with valves (not shown) at the inlet and outlet for the recovered gas, to adjust the gas concentration in the tank 51 in a batch operation by opening and closing the valves, to thereby prevent the gas concentration in the concentration controlling gas reservoir 54 from fluctuating. One or more filters 55 may be provided downstream of the concentration controlling gas reservoir 54, in order to remove particles or the like, as required.

Figure 6:
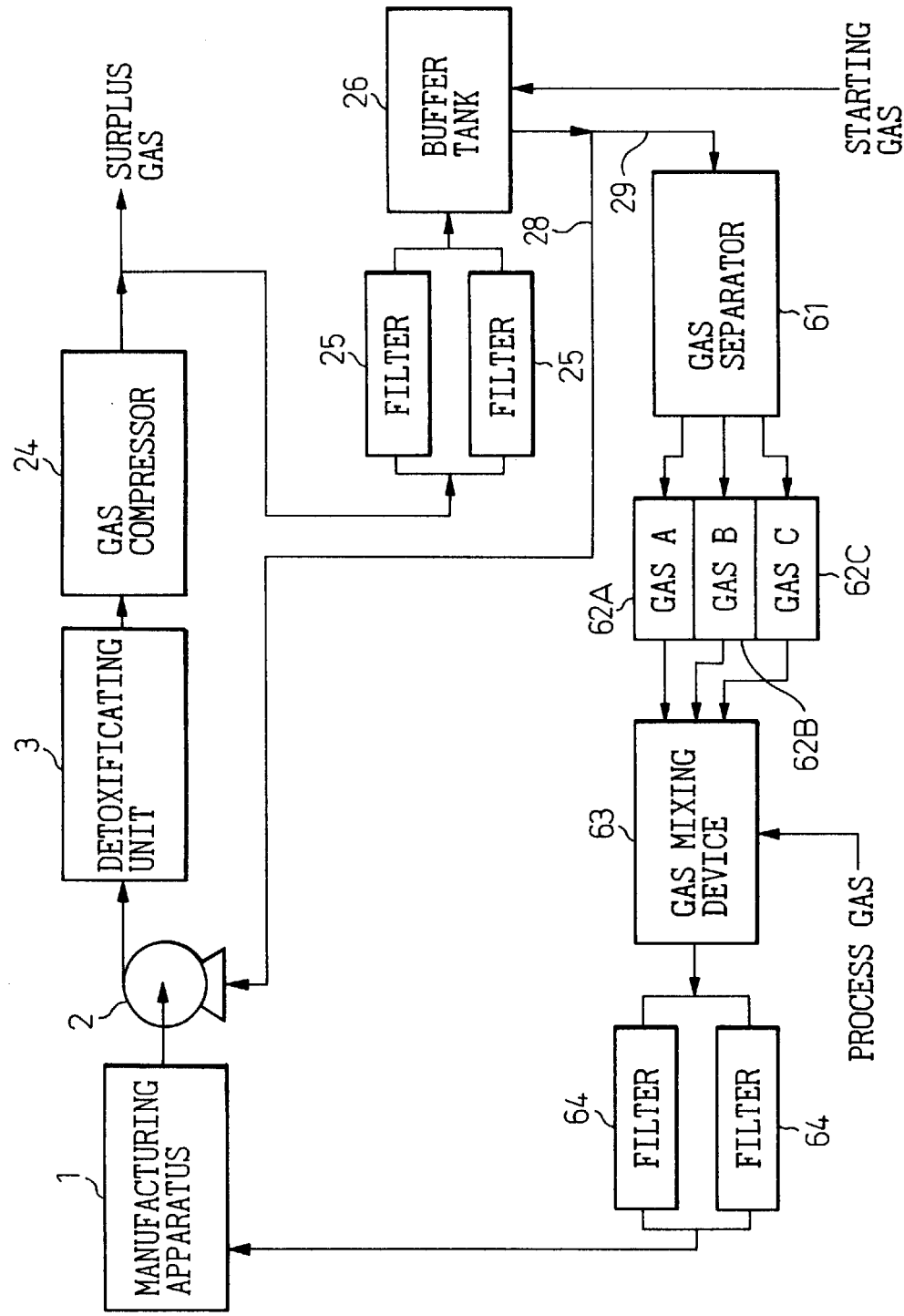
FIG. 6 shows a fourth embodiment of the invention.

A still further embodiment is shown in FIG. 6. In this embodiment, part of the recovered gas from the buffer tank 26 is separated into its components by a gas separator to more precisely control a concentration of gas fed to the manufacturing apparatus 1. Specifically, the recovered gas from the buffer tank 26 is separated into its gas components A, B, and C, by a gas separator 61, which are then stored in the respective gas component buffer tanks 62A, 62B, and 62C. For the separation in the gas separator 61, components usable in the manufacturing apparatus 1 may be separated by membrane separation. Alternatively, the recovered gas from the buffer tank 26 may be liquefied by cooling, to subsequently separate gas components using difference in their boiling points. The respective gas components in the gas component buffer tanks 62A, 62B, and 62C are fed to the manufacturing apparatus 1 at a fixed flow rate so as to make operating conditions in the manufacturing apparatus 1 constant. To this end, flow controllers such as mass flow controllers (not shown) can be used for the respective recovered gas components. Further, to replenish a shortage of a gas component, a make-up gas (process gas) can be supplied to, for example, a gas mixing device 63, to thereby keep a ratio of flow rates of the gas components to be fed to the manufacturing apparatus 1 unchanged. Thus, a process gas having a composition required by a process in the manufacturing apparatus 1 can be provided. The gas mixing device can be any type of mixer which is suitable for homogeneous mixing of the gas components to be fed to the apparatus 1. Prior to feeding the gas from the gas component buffer tanks 62A, 62B, and 62C to the manufacturing apparatus 1, particles or the like may be removed through one or more filters 64.

The invention will now be described in more detail by referring to an example. It is needless to say that the invention is not limited to the example.

Using the system illustrated in FIG. 6, $SiO_2$ is dry etched using plasma in a chamber of a semiconductor device manufacturing apparatus 1. For the etching, $N_2$ is fed at a flow rate of 0.01 liter per minute, Ar at 1.4 liters per minute, He at 0.03 liter per minute, $CF_4$ at 0.01 liter per minute, and $CHF_3$ at 0.01 liter per minute.

First, $CF_4$ is fed to the buffer tank 26 as an initial starting gas. Once the etching takes place by feeding a process gas ($CF_4$ accompanied by a carrier gas mainly made up of argon), PFCs which have been not decomposed by plasma ($CF_4$, $CHF_3$, etc.) are emitted along with $SiF_4$, formed by the reaction of radical molecules generated from $CF_4$ with $SiO_2$, HF formed by decomposition of $CHF_3$, and the like, and a mixture of these gas components is supplied to the vacuum pump 2. The vacuum pump 2 is also supplied with $CF_4$ from the buffer tank 26 for shaft sealing, dilution and the like (after the initial starting, the gas supplied from the buffer tank 26 to the vacuum pump 2 is a gas recovered from the detoxificating unit 3), and the $CF_4$ (after the initial starting, the gas recovered from the detoxificating unit 3) is discharged from the vacuum pump 2 along with the gas emitted from the manufacturing apparatus 1. The mixed gas from the vacuum pump 2 is treated by the detoxificating unit 3, where the harmful gas components such as $SiF_4$ and HF are removed.

The remaining recovered gas components are compressed by the gas compressor 24 to about 0.8 MPa. The compressed gas is then passed through the filter 25, and stored in the buffer tank 26. Most of the stored gas is supplied to the vacuum pump 2 at a flow rate of 25 liters per minute, and the other is sent to the gas separator 61.

In the gas separator 61, the recovered gas from the buffer tank 26 is separated to its components by use of membrane separation (or cryogenic separation). During the separation, components in the recovered gas, such as Ar, $N_2$, and He, may be emitted to the atmosphere, because of a high cost of purification thereof.

The separated $CF_4$ and $CHF_3$ are stored in the respective buffer tanks (for example, tanks 62A and 62B). $CHF_3$ has a high degree of decomposition by plasma discharge, and about 40% is consumed in the manufacturing apparatus 1. On the other hand, about 5% of the $CF_4$ is consumed in the manufacturing apparatus 1. Accordingly, to make up for the consumed $CF_4$ and $CHF_3$, these process gases are added to the gas mixing device 63 to provide a mixed gas of $CF_4$ and $CHF_3$ in a predetermined volume ratio to the manufacturing apparatus 1. When Ar, $N_2$, He and the like are not recovered in the gas separator 61, these gases are added by the manufacturing apparatus 1. In this way, the recovered gas can be used to prepare a gas having a composition required for dry etching, which enables the etching process to continually proceed.

As described, according to the invention, a gas introduced to a vacuum pump for purposes of shaft sealing, improvement of degree of vacuum, prevention of formation of reaction by-products, inhibition of corrosion, an elongated life of the device, and the like, as well as gas components, such as PFCs, emitted from a manufacturing apparatus and discharged by the vacuum pump, can be effectively reused. Thus, it is possible to reduce an amount of harmful exhaust, emitted from, for example, a semiconductor device manufacturing facility, which is regarded as responsible for global warming. Further, since it is unnecessary that a large amount of inert gas such as nitrogen is introduced to a vacuum pump for shaft sealing and the like, an enormous amount of energy is not used to treat the inert gas along with the gas emitted from the manufacturing facility.

What is claimed is:

1. A method for evacuating gas from an apparatus using a vacuum pump which sucks the gas discharged from the apparatus while being supplied with a gas other than the sucked gas, the method comprising recovering at least part of the gas discharged from the vacuum pump, and recirculating the recovered gas to the vacuum pump as said gas other than the sucked gas.

2. The method of claim 1, wherein a substance or substances which are harmful to human body and/or materials used for equipment for carrying out the method are removed from the gas discharged from the vacuum pump, and the remaining gas is then recovered for recirculation.

3. The method of claim 2, wherein the recovered gas is pressurized.

4. The method of claim 3, wherein the recovered and pressurized gas is temporarily stored.

5. The method of claim 4, wherein part of the recovered and pressurized gas is fed to the apparatus.

6. The method of claim 5, wherein the amounts of components of the gas evacuated from the apparatus are measured for controlling operating conditions of the apparatus.

7. The method of claim 5, wherein concentrations of components of part of the recovered and pressurized gas are adjusted prior to being fed to the apparatus.

8. The method of claim 5, wherein part of the recovered and pressurized gas is separated to its components, and the components are mixed with a make-up gas to prepare a process gas having a composition required in the apparatus prior to being fed thereto.

9. A system for evacuating gas from an apparatus, which has a vacuum pump which sucks the gas discharged from the apparatus while being supplied with a gas other than the sucked gas, the system comprising a unit for recovering at least part of the gas discharged from the vacuum pump, and recirculating the recovered gas to the vacuum pump as said gas other than the sucked gas.

10. The system of claim 9, further comprising a unit for removing a substance or substances from the gas discharged from the vacuum pump which are harmful to human body and/or materials used for equipment in the system, and recovering the remaining gas for recirculation.

11. The system of claim 10, further comprising a compressor for pressurizing the recovered gas.

12. The system of claim 11, further comprising a tank for storing the recovered and pressurized gas.

13. The system of claim 11, further comprising a line through which part of the recovered and pressurized gas is fed to the apparatus.

14. The system of claim 13, further comprising a measuring device for measuring amounts of components of the gas evacuated from the apparatus to thereby control operating conditions of the apparatus.

15. The system of claim 13, further comprising a measuring device for measuring the concentration of the recovered gas, and a controller for adjusting the concentration of the recovered gas to be fed to the apparatus.

16. The system of claim 13, further comprising a separator for separating part of the recovered and pressurized gas to its components, and a gas mixing device for mixing the components with a make-up gas to provide a process gas required by the apparatus.

* * * * *